United States Patent
Misra et al.

(10) Patent No.: US 10,294,402 B2
(45) Date of Patent: May 21, 2019

(54) BIODEGRADABLE, FOOD GRADE SHALE STABILIZER FOR USE IN OIL AND GAS WELLS

(71) Applicant: HALLIBURTON ENERGY SERVICES, INC., Houston, TX (US)

(72) Inventors: Garima Misra, Pune (IN); Anita Gantepla, Karnataka (IN)

(73) Assignee: Halliburton Energy Services, Inc., Houston, TX (US)

( * ) Notice: Subject to any disclaimer, the term of this patent is extended or adjusted under 35 U.S.C. 154(b) by 398 days.

(21) Appl. No.: 14/402,287

(22) PCT Filed: Jan. 9, 2014

(86) PCT No.: PCT/US2014/010878
§ 371 (c)(1),
(2) Date: Nov. 19, 2014

(87) PCT Pub. No.: WO2015/105495
PCT Pub. Date: Jul. 16, 2015

(65) Prior Publication Data
US 2016/0304764 A1    Oct. 20, 2016

(51) Int. Cl.
*C09K 8/504* (2006.01)
*C09K 8/08* (2006.01)

(52) U.S. Cl.
CPC .............. *C09K 8/08* (2013.01); *C09K 8/504* (2013.01); *C09K 2208/12* (2013.01)

(58) Field of Classification Search
CPC ... C09K 8/68; C09K 8/90; C09K 8/52; C09K 2208/26; C09K 2208/30; C09K 8/08; C09K 8/685; C09K 8/70; C09K 8/46; C09K 8/508; C09K 8/514; C09K 8/74; C09K 8/72; C09K 8/035; C09K 8/424; C09K 8/524; C09K 8/54; C09K 8/5758; C09K 8/88; C09K 2208/08; C09K 8/032; C09K 8/12; C09K 8/467; C09K 8/512; C09K 8/516; C09K 8/536; C09K 8/62; C09K 8/703; C09K 8/76; C09K 8/905; C09K 8/94; C09K 2208/04; C09K 3/32; C09K 8/03; C09K 8/502; C09K 8/504; C09K 8/518; C09K 8/60; C09K 8/66; C09K 8/80; C09K 8/84; E21B 33/13; E21B 43/04; E21B 33/1208; E21B 43/26; E21B 21/003
See application file for complete search history.

(56) References Cited

U.S. PATENT DOCUMENTS

| | | | | |
|---|---|---|---|---|
| 2,209,591 A * | 7/1940 | Barnes | ........... | C09K 8/22 175/65 |
| 2,658,035 A * | 11/1953 | Bode | ........... | C09K 8/206 127/71 |
| 2,660,561 A * | 11/1953 | Watkins | ........... | E21B 21/003 507/110 |
| 3,086,937 A * | 4/1963 | Fischer | ........... | C09K 8/22 507/131 |
| 3,105,046 A * | 9/1963 | Fischer | ........... | C09K 8/22 507/135 |
| 4,337,160 A * | 6/1982 | Sample, Jr. | ........... | C09K 8/032 507/140 |
| 5,646,093 A | 7/1997 | Dino | | |
| 2003/0199396 A1 | 10/2003 | Schilling et al. | | |
| 2003/0230431 A1* | 12/2003 | Reddy | ........... | C09K 8/12 175/64 |
| 2004/0200386 A1* | 10/2004 | Damodaran | ........... | A61L 15/28 106/135.1 |
| 2006/0019834 A1 | 1/2006 | Melbouci et al. | | |
| 2006/0116296 A1 | 6/2006 | Kippie et al. | | |
| 2006/0148655 A1* | 7/2006 | Mentink | ........... | C08B 30/12 507/111 |
| 2009/0065207 A1* | 3/2009 | Shenoy | ........... | C09K 8/68 166/278 |
| 2009/0175688 A1 | 7/2009 | Patel et al. | | |
| 2010/0227781 A1* | 9/2010 | Tej | ........... | C09K 8/04 507/103 |
| 2013/0306317 A1* | 11/2013 | Karadkar | ........... | C09K 8/514 166/305.1 |

FOREIGN PATENT DOCUMENTS

| | | |
|---|---|---|
| EP | 0702073 A1 | 3/1996 |
| WO | WO2006014717 A1 | 2/2006 |
| WO | WO2006129121 A2 | 12/2006 |
| WO | WO2012171857 A1 | 12/2012 |

OTHER PUBLICATIONS

W. Shurtleff et al, History of Soy Flour, Grits and Flakes (510 CE to 2013) Extensively annotated bibliography and sourcebook, 2013.*

* cited by examiner

*Primary Examiner* — Kumar R Bhushan
(74) *Attorney, Agent, or Firm* — McGuireWoods LLP

(57) ABSTRACT

A method of using an aqueous-based drilling fluid comprises: introducing the drilling fluid into a wellbore, wherein the wellbore penetrates a subterranean formation, wherein the drilling fluid comprises: (A) a base fluid, wherein the base fluid comprises water; and (B) a shale stabilizer additive, wherein the shale stabilizer additive: (i) is made from a protein; (ii) is food grade; and (iii) provides a shale retention of at least 85% for the subterranean formation.

21 Claims, No Drawings

BIODEGRADABLE, FOOD GRADE SHALE STABILIZER FOR USE IN OIL AND GAS WELLS

TECHNICAL FIELD

Additives such as shale stabilizers can be used in aqueous-based drilling fluids. The additive can help prevent adverse effects of the water from the drilling fluid on a water-sensitive subterranean formation.

DETAILED DESCRIPTION

As used herein, the words "comprise," "have," "include," and all grammatical variations thereof are each intended to have an open, non-limiting meaning that does not exclude additional elements or steps.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas, a heterogeneous fluid has more than one distinct phase. A suspension is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and a liquid as the dispersed phase. A heterogeneous fluid will have only one continuous phase, but can have more than one dispersed phase. It is to be understood that any of the phases of a heterogeneous fluid (e.g., a continuous or dispersed phase) can contain dissolved or undissolved substances or compounds. The "base fluid" is the solvent of a solution or the continuous phase of a heterogeneous fluid. As used herein, the phrase "aqueous-based" means a solution wherein an aqueous liquid is the solvent or a heterogeneous fluid wherein an aqueous liquid is the continuous phase.

Oil and gas hydrocarbons are naturally occurring in some subterranean formations. In the oil and gas industry, a subterranean formation containing oil or gas is referred to as a reservoir. A reservoir may be located on land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, or an injection well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A wellbore is formed using a drill bit. A drill string can be used to aid the drill bit in drilling through a subterranean formation to form the wellbore. The drill string can include a drilling pipe. During drilling operations, a drilling fluid, sometimes referred to as a drilling mud, may be circulated downwardly through the drilling pipe and back up the annulus between the wellbore and the outside of the drilling pipe. The drilling fluid performs various functions, such as cooling the drill bit, maintaining the desired pressure in the well, and carrying drill cuttings upwardly through the annulus between the wellbore and the drilling pipe.

Due to the low cost of obtaining water, most drilling fluids are aqueous based. However, some subterranean formations can be adversely affected by water. One example of a formation that can be adversely affected by an aqueous-based drilling fluid is a water-sensitive formation. When the water of the drilling fluid comes in contact with a water-sensitive formation, then the water can adversely affect the subterranean formation. Some of the adverse effects can include swelling or sloughing of the subterranean formation or gumbo formation.

An example of a water-sensitive formation is a shale formation. Shale formations are different from other types of formations, and there are even differences between individual shale formations. Typically, no two shale formations are the same. Therefore, finding ways to explore and develop shale gas from these formations is a challenge. However, exploration and production of shale gas as an alternative to natural gas produced from "traditional formations" continues to receive increased interest due to the vast quantity of unproduced shale gas around the world, and especially in North America.

Additives, such as shale stabilizers, can be added to a drilling fluid to help minimize the adverse effects of the water on a water-sensitive formation. There is a continuing need and thus, ongoing industry-wide interest in new drilling fluids that contain environmentally-friendly additives that are not harmful to people. It has been discovered that food grade proteins can be used as a shale stabilizer in aqueous-based drilling fluids. The stabilizer is edible and biodegradable. The stabilizer can be used in a water-sensitive formation to eliminate or reduce erosion or sloughing or gumbo formation.

Some of the desirable properties of a drilling fluid include: good rheology; low fluid loss into the subterranean formation; and a high shale retention value.

If any laboratory test (e.g., rheology or fluid loss) requires the step of mixing, then the drilling fluid is mixed according to the following procedures. A known volume (in units of barrels) of the aqueous liquid is added to a mixing container and the container is then placed on a mixer base. The motor of the base is then turned on and maintained at 11,200 to 11,800 revolutions per minute (rpm). Any of the following ingredients are then added to the aqueous liquid and mixed for at least 5 minutes before adding the next ingredient, wherein the ingredients are added in order of the first ingredient to last ingredient as follows: a viscosifier; a filtration control agent; a shale stabilizer additive; a weighting agent; and a pH buffer. The ingredients can be added at a stated concentration of weight by volume of the drilling fluid, for example, in units of pounds per barrel of the drilling fluid. It is to be understood that any mixing is performed at ambient temperature and pressure—about 71° F. (22° C.) and about 1 atm (0.1 MPa).

It is also to be understood that if any laboratory test (e.g., rheology or fluid loss) requires the test be performed at a specified temperature and possibly a specified pressure, then the temperature and pressure of the drilling fluid is ramped up to the specified temperature and pressure after being mixed at ambient temperature and pressure. For example, the drilling fluid can be mixed at 71° F. (22° C.) and 1 atm (0.1 MPa) and then placed into the testing apparatus and the temperature of the drilling fluid can be ramped up to the specified temperature. As used herein, the rate of ramping up the temperature is in the range of about 3° F./min to about 5° F./min (about 1.67° C./min to about 2.78° C./min) to simulate actual wellbore conditions. After the drilling fluid is ramped up to the specified temperature and possibly pressure, the drilling fluid is maintained at that temperature and pressure for the duration of the testing.

A drilling fluid should exhibit good rheology. Rheology is a measure of how a material deforms and flows. As used herein, the "rheology" of a drilling fluid is measured according to ANSI/API 13B-1 section 6.3, Recommended Practice for Field Testing of Water-based Drilling Fluids as follows. The drilling fluid is mixed. The drilling fluid is placed into the test cell of a rotational viscometer, such as a FANN® Model 35 viscometer, fitted with a Bob and Sleeve attachment and a F1 spring number. The drilling fluid is tested at the specified temperature and ambient pressure, about 1 atm (0.1 MPa). Rheology readings are taken at multiple revolutions per minute "rpm," for example, at 3, 6, 100, 200, 300, and 600.

A substance can develop gel strength. As used herein, the "10 s gel strength" of a drilling fluid is measured according to ANSI/API 13B-1 section 6.3, Recommended Practice for Field Testing of Water-based Drilling Fluids as follows. After the rheology testing of the substance is performed, the substance is allowed to sit in the test cell for 10 seconds (s). The motor of the viscometer is then started at 3 rpm. The maximum deflection on the dial reading is then multiplied by 0.48 to obtain the gel strength at 10 s in units of lb/100 ft². As used herein, the "10 min gel strength" is measured as follows. After the initial gel strength test has been performed, the substance is allowed to sit in the test cell for 10 minutes (min). The motor of the viscometer is then started at 3 rpm. The maximum deflection on the dial reading is the gel strength at 10 min in units of lb/100 ft². To convert the units to Pascal (Pa), the dial reading is multiplied by 0.511.

As used herein, the "plastic viscosity" of a drilling fluid is obtained from the Bingham-Plastic rheological model and calculated as the difference between the 600 rpm and 300 rpm dial readings from the rheology testing, expressed in units of cP.

The yield point ("YP") is defined as the value obtained from the Bingham-Plastic rheological model when extrapolated to a shear rate of zero. As used herein, the "yield point" of a drilling fluid is calculated as the difference between the plastic viscosity and the 300 rpm dial reading, expressed in units of lb/100 ft². To convert the units to Pa, the difference is multiplied by 0.48. Similarly, the yield stress or Tau zero is the stress that must be applied to a material to make it begin to flow (or yield), and may commonly be calculated from rheometer readings measured at rates of 3, 6, 100, 200, 300 and 600 rpm. The extrapolation in this case may be performed by applying a least-squares fit or curve fit to the Herchel-Bulkley rheological model.

Another desirable property of a drilling fluid is low fluid loss. As used herein, the "fluid loss" of a drilling fluid is tested according to ANSI/API 13B-1, Fourth edition, section 7.2, Recommended Practice for Field Testing of Water-based Drilling Fluids procedure at a specified temperature and pressure differential as follows. The drilling fluid is mixed. The drilling fluid is stirred for 5 min using a multi-mixer. The drilling fluid is poured into the filter cell. The testing apparatus is assembled with a filter paper inserted into the apparatus. The specified pressure differential is set. A timer is started and filtrate out of the testing apparatus is collected in a separate volumetric container. The testing is performed for 30 min. The total volume of filtrate collected is read. Fluid loss is measured in milliliters (mL) of fluid collected in 30 min.

Another desirable property of a drilling fluid is a high shale retention value. A shale erosion test is commonly employed to determine the ability of a drilling fluid and/or the additives therein to prevent a shale formation from eroding. Such erosion, when encountered in actual field conditions in a borehole, and as noted above, can lead to problems ranging from sloughing, to a washout, to a complete collapse of the borehole. As used herein, the "shale retention" test is performed as follows. The drilling fluid is mixed. The drilling fluid is hot rolled at 150° F. (66° C.) for 16 hours. A portion of a specified shale formation is crushed and ground into particles that passed through a dry sieve US #5 mesh screen but are retained on a dry sieve US #10 mesh screen. 30 grams (g) of the ground shale and 1 barrel (350 mL) of the drilling fluid are placed into a pint jar (350 ml). The shale/drilling fluid mixture is then hot rolled on a rolling apparatus at a temperature of 150° F. (66° C.) for 16 hours. The drilling fluid is then screened through the dry sieve US #10 mesh screen and the retained solids are washed with a synthetic seawater or a 5% potassium chloride (KCl) solution, dried, and weighed. The percent of shale retention is calculated according to the following formula, where FW=the final weight in grams of the dried shale recovered (corrected for the moisture content of the original sample) and IW=the initial weight of the sample. A shale retention value of greater than or equal to 95% indicates a high shale retention value.

$$\text{Shale Retention} = \frac{FW}{IW} * 100\%$$

Any of the ingredients included in the drilling fluid can be inherently biodegradable. Inherent biodegradability refers to tests, which allow prolonged exposure of the test substance to microorganisms. As used herein, a substance with a biodegradation rate of >20% is regarded as "inherently primary biodegradable." A substance with a biodegradation rate of >70% is regarded as "inherently ultimate biodegradable." A substance passes the inherent biodegradability test if the substance is either, regarded as inherently primary biodegradable or inherently ultimate biodegradable.

According to an embodiment, an aqueous-based drilling fluid comprises: a base fluid, wherein the base fluid comprises water; and a shale stabilizer additive, wherein the shale stabilizer additive: (A) is made from a protein; (B) is food grade; and (C) is biodegradable.

According to another embodiment, a method of using an aqueous-based drilling fluid comprises: introducing the drilling fluid into a wellbore, wherein the wellbore penetrates a subterranean formation, wherein the drilling fluid comprises: (A) a base fluid, wherein the base fluid comprises water; and (B) a shale stabilizer additive, wherein the shale stabilizer additive: (i) is made from a protein; (ii) is food grade; and (iii) provides a shale retention of at least 85% for the subterranean formation.

The discussion of preferred embodiments regarding the drilling fluid or any ingredient in the drilling fluid, is intended to apply to the composition embodiments and the method embodiments. Any reference to the unit "gallons" means U.S. gallons.

The base fluid comprises water. The water can be selected from the group consisting of freshwater, brackish water, saltwater, and any combination thereof. The drilling fluid can further include a water-soluble salt. Preferably, the salt is selected from the group consisting of sodium chloride, calcium chloride, calcium bromide, potassium chloride, potassium bromide, magnesium chloride, sodium bromide, cesium formate, cesium acetate, and any combination thereof. The water-soluble salt can be in a concentration in the range of about 5 to about 25 pounds per barrel "ppb" of the drilling fluid or in the range of about 10 to about 20 ppb of the drilling fluid.

The drilling fluid includes the shale stabilizer additive. The shale stabilizer additive is made from a protein. The protein can be any food grade protein. As used herein, the term "food grade" means considered safe for use in food by the United States Food and Drug Administration (FDA) as of Jan. 9, 2014. In other words, consumption of a food grade product is considered to not cause harm to the consumer by the U.S. FDA. Examples of proteins include, but are not limited to: legumes, such as soybeans, black beans, red beans, lentils, etc.; casein; nuts, such as peanuts; whey protein; gelatins; *quinoa*; teff; egg whites; baker's yeast; *spirulina algea*; hemp seeds; and combinations thereof. The shale stabilizer additive can also be made from: the flour of the protein, for example, soy flour; grits of the protein, for example soy grits; or a powdered form of the protein. According to an embodiment, the protein is from soybeans.

According to an embodiment, the shale stabilizer additive is soluble in the base fluid. As used herein, the term "soluble" means at least 5 parts of the substance dissolves in 100 parts of the solvent. Therefore, the shale stabilizer additive preferably has a fat content less than or equal to the amount necessary for the shale stabilizer additive to be soluble in the base fluid. The shale stabilizer additive can be a defatted protein. As used herein, the term "defatted" means the protein contains less fat than the naturally-occurring protein. The shale stabilizer additive can have a fat content in the range of about 10% to about 0.5% fat. The fat can include saturated fat, mono-unsaturated fat, and poly-unsaturated fat. According to an embodiment, the shale stabilizer additive is a defatted soy flour.

The drilling fluid can further include a viscosifier. The viscosifier can be selected from the group consisting of fatty acids, natural and synthetic polymers, polysaccharide derivatives such as xanthan gum, guar gum, hydroxyalkylguar, hydroxyalkylcellulose, carboxyalkylhydroxyalkylguar, wellan gum, gellan gum, diutan, scleroglucan, succinoglucan, various celluloses, biopolymers, and combinations thereof. Commercially-available examples of a suitable viscosifier include, but are not limited to, BARAZAN® D PLUS, PAC™-R, PAC™-RE, PAC™-L, AQUA-GEL®, AQUAGEL GOLD SEAL®, and combinations thereof, marketed by Halliburton Energy Services, Inc. According to an embodiment, the viscosifier is in a concentration of at least 0.05 ppb of the drilling fluid. The viscosifier can also be in a concentration in the range of about 0.05 to about 10 ppb, alternatively of about 0.5 to about 5 ppb, of the drilling fluid.

The drilling fluid can further include a weighting agent. The weighting agent can be selected from the group consisting of barite, hematite, manganese tetroxide, calcium carbonate, and combinations thereof. Commercially-available examples of a suitable weighting agent include, but are not limited to, Barite, BAROID®, BARACARB®, BARODENSE®, MICROMAX™, and combinations thereof, marketed by Halliburton Energy Services, Inc. According to an embodiment, the weighting agent is in a concentration of at least 10 ppb of the drilling fluid. The weighting agent can also be in a concentration in the range of about 10 to about 500 ppb of the drilling fluid. According to another embodiment, the weighting agent is in at least a sufficient concentration such that the drilling fluid has a density in the range of about 9 to about 20 pounds per gallon (ppg) (about 1.078 to about 2.397 kilograms per liter "kg/L"). Preferably, the weighting agent is in at least a sufficient concentration such that the drilling fluid has a density in the range of about 9 to about 18 ppg (about 1.1 to about 2.4 kg/L).

The drilling fluid can further include a filtration control agent. The filtration control agent can be selected from the group consisting of: starches, such as potato starch, corn starch, tapioca starch, wheat starch and rice starch; cellulose, polymeric, lignosulfonates, polysaccharides, and combinations thereof. Commercially-available examples of a suitable filtration control agent include, but are not limited to, PAC™-R, DEXTRID® E, and combinations thereof, marketed by Halliburton Energy Services, Inc. According to an embodiment, the filtration control agent is in at least a sufficient concentration such that the drilling fluid has an API fluid loss of less than 10 mL/30 min at a temperature of 73° F. (23° C.) and a pressure differential of 100 pounds force per square inch "psi" (0.7 MPa), more preferably less than 5 mL/30 min. According to another embodiment, the filtration control agent is in a concentration of at least 0.5 ppb of the drilling fluid. The filtration control agent can also be in a concentration in the range of about 0.5 to about 10 ppb of the drilling fluid.

The drilling fluid can also include a friction reducer. Commercially-available examples of a suitable friction reducer include, but are not limited to, TORQ-TRIM® 22, LUBRA-BEADS®, EZMUD LUBE®, NXS-LUBE™, DRIL-N-SLIDE™, ENVIRO-TORQ®, graphitic carbon, and combinations thereof, marketed by Halliburton Energy Services, Inc. The friction reducer can be in a concentration of at least 0.5 ppb of the drilling fluid. In an embodiment, the friction reducer is in a concentration in the range of about 0.5 to about 5 ppb of the drilling fluid.

The drilling fluid can have a pH in the range of about 7.5 to about 12.5. The drilling fluid can further comprise a pH adjuster. The pH adjuster can be an acid or a base. According to an embodiment, the pH adjuster is selected and the pH adjuster is in a concentration such that the drilling fluid has a pH in the range of about 7.5 to about 12.5. The drilling fluid can also include a pH buffer. A commercially-available example of a pH buffer is BARABUF®. The pH buffer can be in a concentration in the range of about 0.05 to about 5 ppb of the drilling fluid.

According to the method embodiments, the methods include introducing the drilling fluid into a wellbore, wherein the wellbore penetrates a subterranean formation. The shale stabilizer additive provides a shale retention value of at least 85%, preferably at least 90%, more preferably at least 95%, for the subterranean formation. The subterranean formation can be on land or off shore. The subterranean formation is preferably a water-sensitive formation. According to another embodiment, the subterranean formation is a shale formation.

The step of introducing the drilling fluid can be for the purpose of drilling the wellbore. The drilling fluid can be in a pumpable state before and during introduction into the wellbore. The well can be an oil, gas, and/or water production well, an injection well, or a geothermal well. The subterranean formation can include an annulus. The step of introducing the drilling fluid can include introducing the drilling fluid into a portion of the annulus.

The methods can further include the step of introducing a spacer fluid into the wellbore after the step of introducing the drilling fluid. The methods can also further include the step of introducing a cement composition into the wellbore. As used herein, a "cement composition" is a mixture of at least cement and water, and possibly additives. As used herein, the term "cement" means an initially dry substance that, in the presence of water, acts as a binder to bind other materials together. An example of cement is Portland cement. The step of introducing the cement composition can be performed after the step of introducing the drilling fluid. If the methods also include the step of introducing a spacer fluid, then the step of introducing the cement composition can be performed after the step of introducing the spacer fluid. The step of introducing the cement composition can be for the purpose of at least one of the following: well completion; foam cementing; primary or secondary cementing operations; well-plugging; and gravel packing. The cement composition can be in a pumpable state before and during introduction into the subterranean formation. The step of introducing can include introducing the cement composition into the well. According to another embodiment, the subterranean formation is penetrated by a well and the well includes an annulus. According to this other embodiment, the step of introducing can include introducing the cement composition into a portion of the annulus.

The method embodiments can also include the step of allowing the cement composition to set. The step of allowing can be performed after the step of introducing the cement composition into the subterranean formation. The methods can further include the additional steps of perforating, fracturing, or performing an acidizing treatment, after the step of allowing.

Examples

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables, the concentration of any ingredient in a drilling fluid is expressed as pounds per barrel of the drilling fluid (abbreviated as "ppb").

Each of the drilling fluids were mixed and tested according to the procedure for the specific test as described in The Detailed Description section above. Rheology testing, 10 second and 10 minute gel strength, plastic viscosity, and yield point were conducted at a temperature of 120° F. (49° C.). API fluid loss testing was conducted at a pressure differential of 100 psi (0.7 MPa) and a temperature of 73° F. (23° C.). Shale retention testing was performed on samples from the London clay formation at a temperature of 150° F. (66° C.).

Table 1 contains a list of the ingredients and their respective concentrations for three different drilling fluids. Each of the drilling fluids had a density of 11 pounds per gallon "ppg" and contained the following ingredients, listed at a concentration of ppb of the drilling fluid: water; sodium chloride; BARAZAN® D PLUS viscosifier; PAC™-R filtration control agent; DEXTRID® E filtration control agent; BARABUF® pH buffer; and barite weighting agent. Drilling fluid #1 was a control fluid without any shale stabilizer additive. Drilling fluids #2 & 3 also had varying concentrations of a defatted soy flour as the shale stabilizer additive.

TABLE 1

| | Drilling Composition # | | |
|---|---|---|---|
| Ingredient | 1 | 2 | 3 |
| Water | 306.00 | 307.00 | 303.00 |
| NaCl | 17.00 | 17.00 | 17.00 |
| BARAZAN ® D PLUS | 0.65 | 0.65 | 0.65 |
| PAC ™-R | 1.00 | 1.00 | 1.00 |
| DEXTRID ® E | 2.00 | 2.00 | 2.00 |
| BARABUF ® | 0.50 | 0.50 | 0.50 |
| Defatted Soy flour | 0.00 | 4.00 | 7.00 |
| Barite | 130.00 | 127.00 | 124.00 |

Table 2 contains rheology data, plastic viscosity "PV," yield point "YP," and 10 s and 10 min gel strength data for the drilling fluids. As can be seen in Table 2, drilling fluids #2 & 3 exhibited comparable rheologies to the control fluid #1. Moreover, all of the drilling fluids had comparable PV, YP, and gel strengths.

TABLE 2

| Drilling Composition # | Rheology (rpm) | | | | | | PV (cP) | YP (lb/ 100 ft$^2$) | 10 s Gel Strength (lb/ 100 ft$^2$) | 10 min Gel Strength (lb/100 ft$^2$) |
|---|---|---|---|---|---|---|---|---|---|---|
| | 3 | 6 | 100 | 200 | 300 | 600 | | | | |
| 1 | 4 | 6 | 22 | 32 | 41 | 57 | 16 | 25 | 5 | 5 |
| 2 | 5 | 7 | 26 | 38 | 46 | 64 | 18 | 28 | 5 | 6 |
| 3 | 5 | 7 | 25 | 35 | 43 | 63 | 20 | 23 | 5 | 5 |

Table 3 contains fluid loss and shale retention data for the drilling fluids. As can be seen in Table 3, drilling fluids #2 & 3 that contained the shale stabilizer additive exhibited less fluid loss compared to the control fluid #1. This indicates that the shale stabilizer additive also reduces the amount of fluid loss. Fluids #2 & 3 had much higher shale retention compared to fluid #1. Moreover, fluid #3, which contained the shale stabilizer additive in the highest concentration, had a higher shale retention compared to fluid #2. This indicates that not only does the defatted soy flour work effectively as a shale stabilizer, but that the concentration of the shale stabilizer additive can be adjusted to provide the optimum shale retention value.

TABLE 3

| Drilling Composition # | API Fluid loss (mL/30 min) | Shale Retention (%) |
|---|---|---|
| 1 | 7.4 | 71.85 |
| 2 | 4.6 | 93.80 |
| 3 | 4.0 | 99.93 |

Table 4 contains the ingredients and concentration for London Clay. As can be seen in Table 3, London Clay contains a high percentage of Smectite. Smectite is known for its high percentage of swelling and other water-related problems. As such, London clay is considered to be the worst clay for water-related problems compared to other types of clays. Therefore, since the shale stabilizer shows good results on London clay, then it can be assumed that the shale stabilizer will also work effectively as a shale stabilizer for other types of clays.

TABLE 4

| Ingredient | Concentration (wt. %) |
|---|---|
| Quartz | 22 |
| Smectite | 28 |
| Illite | 38 |
| Kaolin | 6 |
| Chlorite | 4 |
| Total clay (mg/100 g) | 76 |

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b,") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of using an aqueous-based drilling fluid comprising:
    introducing the drilling fluid into a wellbore, wherein the wellbore penetrates a subterranean formation, wherein the drilling fluid comprises:
    (A) a base fluid, wherein the base fluid comprises water; and
    (B) a shale stabilizer additive, wherein the shale stabilizer additive:
        (i) is made from a protein selected from the group consisting of legumes; casein; nuts; whey protein; gelatins; *quinoa*; teff; egg whites; baker's yeast; *spirulina* algae; hemp seeds; and combinations thereof;
        (ii) is food grade per the United States Food and Drug Admiration regulations as of Jan. 9, 2014; and
        (iii) provides a shale retention of at least 85% for the subterranean formation.

2. The method according to claim 1, wherein the water is selected from the group consisting of freshwater, brackish water, saltwater, and any combination thereof.

3. The method according to claim 1, wherein the drilling fluid further comprises a water-soluble salt.

4. The method according to claim 3, wherein the salt is selected from the group consisting of sodium chloride, calcium chloride, calcium bromide, potassium chloride, potassium bromide, magnesium chloride, sodium bromide, cesium formate, cesium acetate, and any combination thereof.

5. The method according to claim 3, wherein the water-soluble salt is in a concentration in the range of about 5 to about 25 pounds per barrel of the drilling fluid.

6. The method according to claim 1, wherein the shale stabilizer additive is made from: the flour of the protein; grits of the protein; or a powdered form of the protein.

7. The method according to claim 1, wherein the shale stabilizer additive is soluble in the base fluid.

8. The method according to claim 7, wherein the shale stabilizer additive has a fat content less than or equal to the amount necessary for the shale stabilizer additive to be soluble in the base fluid.

9. The method according to claim 8, wherein the shale stabilizer additive is a defatted protein.

10. The method according to claim 8, wherein the shale stabilizer additive has a fat content in the range of about 10% to about 0.5%.

11. The method according to claim 1, wherein the shale stabilizer additive is a defatted soy flour.

12. The method according to claim 1, wherein the drilling fluid further comprises a viscosifier, a weighting agent, a filtration control agent, or combinations thereof.

13. The method according to claim 12, wherein the weighting agent is in a concentration in the range of about 10 to about 500 pounds per barrel of the drilling fluid.

14. The method according to claim 12, wherein the weighting agent is in at least a sufficient concentration such that the drilling fluid has a density in the range of about 9 to about 20 pounds per gallon.

15. The method according to claim 12, wherein the filtration control agent is in at least a sufficient concentration such that the drilling fluid has an API fluid loss of less than 10 mL/30 min at a temperature of 73° F. and a pressure differential of 100 pounds force per square inch.

16. The method according to claim 1, wherein the shale stabilizer additive provides a shale retention value of at least 90% for the subterranean formation.

17. The method according to claim 1, wherein the subterranean formation is a water-sensitive formation.

18. The method according to claim 1, wherein the subterranean formation is a shale formation.

19. The method according to claim 1, further comprising mixing the drilling fluid with a mixing apparatus.

20. The method according to claim 1, wherein the step of introducing comprises pumping the drilling fluid into the wellbore.

21. The method according to claim 1, further comprising forming the wellbore with the drilling fluid.

* * * * *